W. H. WAFER.
DETACHABLE COUPLING FOR PIPE UNIONS.
APPLICATION FILED FEB. 5, 1917.
1,232,129.
Patented July 3, 1917.
2 SHEETS—SHEET 1.
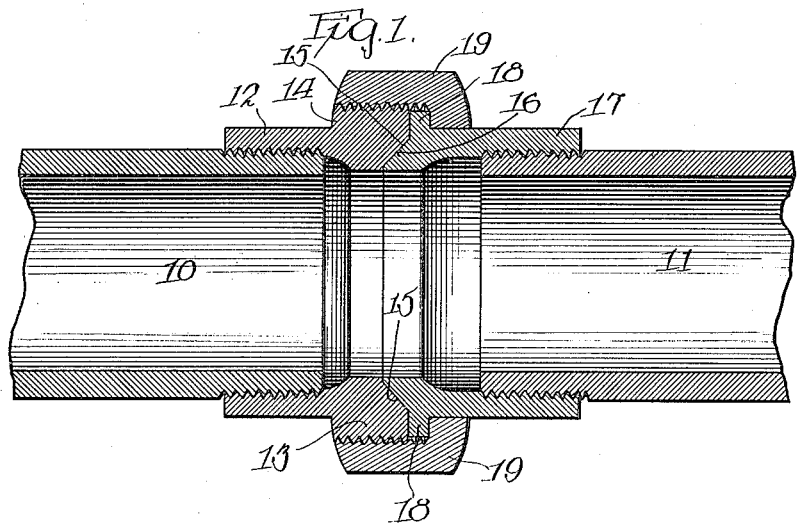
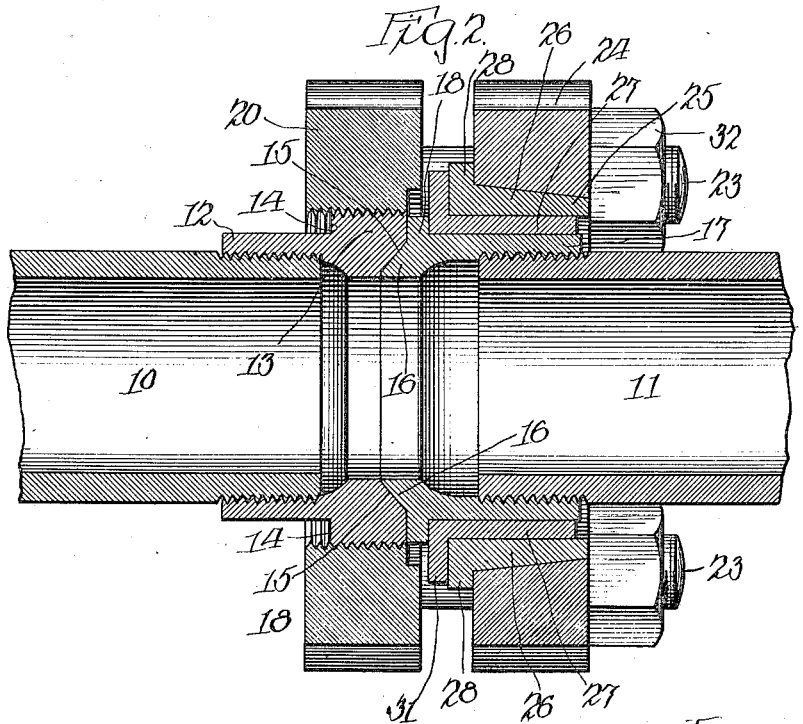

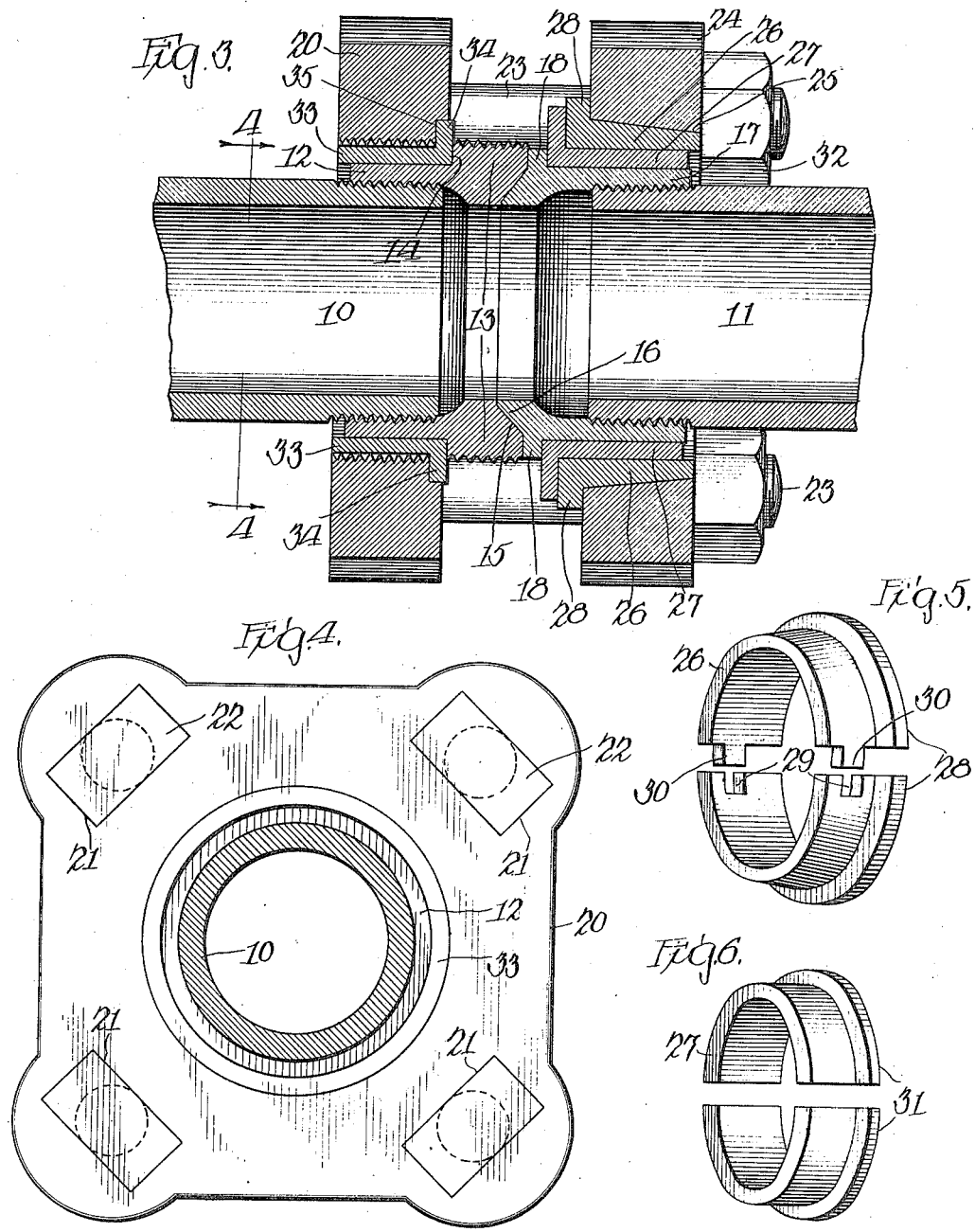

UNITED STATES PATENT OFFICE.

WILLIAM H. WAFER, OF AUSTIN, ILLINOIS.

DETACHABLE COUPLING FOR PIPE-UNIONS.

1,232,129.  Specification of Letters Patent.  Patented July 3, 1917.

Application filed February 5, 1917. Serial No. 146,559.

*To all whom it may concern:*

Be it known that I, WILLIAM H. WAFER, a citizen of the United States, residing at Austin, in the county of Cook and State of Illinois, have invented certain new and useful Improvements in a Detachable Coupling for Pipe-Unions, of which the following is a specification.

This invention relates to improvements in a detachable coupling for steam joint and other pipe unions, and it consists in certain peculiarities of the construction, novel arrangement and operation of the various parts thereof, as will be hereinafter more fully set forth and specifically claimed.

The principal object of the invention, is, to provide a detachable coupling to replace, or to be used instead of hose couplings or steam joint unions that have been united by a swivel threaded nut and tail-piece and a threaded connecting end piece, without removing the tail piece or said end piece from the pipe or hose to which they are attached, when the threads have been stripped from the nuts or the nuts have been stretched by reason of strain or expansion, or when they have become useless from rust.

Other objects and advantages of the invention, will be disclosed in the subjoined description and explanation.

In the accompanying drawings, which serve to illustrate an embodiment of the invention, Figure 1, is a longitudinal sectional view of a pipe union of the old style, or of that type in which a swivel threaded nut and tail piece and a threaded connecting end piece is employed to unite two pieces of pipe, and in connection with which after the swivel nut has been discarded, my improvements are intended to be employed.

Fig. 2, is a longitudinal sectional view of a pipe union showing one form of my improvements in place thereon and in their operative positions.

Fig. 3, is a similar view of like parts illustrating a modification in the construction of my improved coupling.

Fig. 4, is a view partly in section and partly in elevation, taken on line 4—4 of Fig. 3, looking in the direction indicated by the arrows.

Fig. 5, is a detached perspective view of one of the retaining sleeves used in connection with one of the plates of the coupling, and Fig. 6, is a similar view of another one of the sectional retaining sleeves.

Like numerals of reference, refer to like parts throughout the different views of the drawings.

Referring now particularly to Fig. 1 of the drawings, the numeral 10 designates one of the pipe sections to be joined together, and the numeral 11 the other of said pipe sections. Screwed on to one end of the pipe 10 is an end piece 12 which has an externally screw-threaded enlargement 13 at its end adjacent to the pipe 11, which enlargement forms an annular shoulder 14 at a point located near the inner end of the internal screw-threads of the end piece 12 as will be readily understood by reference to the different views of the drawings. The end piece 12 adjacent to the pipe section 11 is inwardly beveled as at 15 to receive a correspondingly shaped portion 16 on the tail piece 17 which is internally screw-threaded to engage the screw-threads on the pipe section 11 as shown. The tail piece 17 is provided with an annular flange 18 to rest against that end of the end piece 12 adjacent the pipe section 11. The parts constructed as above described are employed in each of the constructions shown in Figs. 2 and 3 of the drawings, but it will be noted in said views that the swivel collar 19 employed in the construction illustrated in Fig. 1, to unite the end piece 12 and the tail piece 17, is omitted and my improved coupling is employed instead of said nut, and consists of an internally screw-threaded plate 20 which has in one of its faces a number of countersunk openings 21 which are rectangular in shape and adapted to receive correspondingly shaped heads 22 on bolts 23 which are passed through suitable openings in the plate 20 and unite said plate to another plate 24 which latter plate is also provided with openings for the reception of said bolts.

Referring now to Fig. 2 of the drawings, it will be understood that the screw-threads on the enlargement 13 of the end piece 12 are not impaired, and it will be seen that the plate 20 is mounted in screw-threaded engagement with said enlargement. The plate 24 which constitutes a part of my improved coupling is provided with an opening 25 which tapers from the face of the plate 24 adjacent the plate 20 to its opposite surface and is for the reception of one or both of the sectional sleeves 26 and 27, the former of which sleeves is correspondingly tapered on its outer surface and the sections constituting this sleeve are provided at one of their ends with flanges 28 to rest against the inner surface of the plate 24 as will be readily understood by reference to Fig. 2 of the drawings. As shown in Fig. 5, the sleeve 22 consists of two semi-circular sections one of which has in each of its ends a recess 29 and the other of said sections has on each of its ends a projection 30 to fit in said recesses thus interlocking the sections of the sleeve 26 so that they will act as a unit when the plate 24 is placed thereon. It is obvious however that the recesses 29 and projections 30 may be omitted if desired. The sleeve 27 is also made of two semi-circular sections each of which is provided at one of its ends with an outwardly extended flange 31 which will rest against the flange 18 on the tail piece 17 when said sleeve is used and when the parts are assembled as shown in Figs. 2 and 3 of the drawings. It will be observed that the sleeve 27 is without any taper and it will be understood that in some instances this sleeve may be omitted, in which case, the flanges 28 of the sleeve 26 will rest against the flange 18 of the tail piece when the plates 20 and 24 are clamped together by means of the nuts 32 on the bolts 23 which unite said plates.

Now, assuming that the screw-threads on the enlargement 13 of the end piece 12 have become impaired by rust or stripping so that the threads on the plate 20 will not effectively engage said threads on the end piece, the said plate can be passed over the enlarged portion 13 of the end piece and moved away from the joint when a sleeve 33 which is sectional and of the construction shown in Fig. 6 and above described may be placed in the opening of the plate 20 as shown in Fig. 3 when it is apparent that the flange 34 on the sleeve 33 will rest against the shoulder 14 of the end piece and will fit in a recess 35 in the plate 20 so that by tightening the nuts 32 on the bolts 23 the coupling and union may be securely and firmly united. By employing the tapered sleeve 26 it is obvious that when the plates 20 and 24 are bolted together, the taper on the sleeve and face and the taper of the opening in the plate 24 will form a metal to metal bearing and the strain will be divided on the bearing side of the plate and sleeve and the face of said plate and the flange of the tapered sleeve.

Having thus fully described my invention, what I claim as new and desire to secure by Letters Patent is—

1. In a device of the character described, the combination with a pipe union having an end piece provided with a screw-threaded enlargement at one of its ends and mounted on one of the pipes and a tail piece mounted on the adjacent end of the other pipe and provided with an annular flange at one of its ends, of a plate having a screw-threaded opening and mounted on said end piece, another plate having an opening tapered from the first named plate and surrounding said tail piece, a sleeve having its outer surface tapered to correspond with the taper of the opening in the last named plate, said sleeve located in said opening and having at one of its ends an outwardly extended flange, and means to unite and clamp said plates.

2. In a device of the character described, the combination with a pipe union having an end piece provided with an enlargement at one of its ends and mounted on one end of a pipe and a tail piece mounted on the adjacent end of the other pipe and provided with an annular flange at its end adjacent to said end piece, of a plate having an opening for the reception of said end piece, a sleeve mounted on the end piece between it and the wall of the opening in said plate and having a flange to engage the enlargement on said end piece and said plate, another plate having an opening tapered from the first named plate and surrounding said tail piece, a sleeve consisting of a plurality of sections tapered on their outer surface so that when said sections are placed together the outer surface of said sleeve will correspond with the taper of the opening in the last named plate, said sleeve located in said opening and having at one of its ends an outwardly extended flange, and means to unite and clamp said plates.

3. In a device of the character described, the combination with a pipe union having an end piece provided with an enlargement at one of its ends mounted on one of the pipes and a tail piece mounted on the adjacent end of the other pipe and provided with an annular flange at its end adjacent to said end piece, of a plate having an opening for the reception of said end piece, a sleeve mounted on the end piece between it and the wall of the opening in said plate and having a flange to engage the enlargement on said end piece and said plate, another plate having an opening tapered from the first named plate and surrounding said tail-piece, a sleeve having its outer surface tapered to correspond with the taper of the opening in the last named plate, said sleeve located in said opening and having at one of its ends an outwardly extended flange, and means to unite and clamp said plates.

4. In a device of the character described, the combination with a pipe union having an end piece provided with a screw-threaded enlargement at one of its ends and mounted on one of the pipes and a tail piece mounted on the adjacent end of the other pipe and provided with an annular flange at one of its ends, a plate having a screw-threaded opening and mounted on said end piece, another plate having an opening tapered from the first named plate and surrounding said tail-piece, a sleeve consisting of a plurality of sections having interlocking means and tapered on its outer surface to correspond with the taper of the opening in the last named plate, said sleeve located in said opening and having at one of its ends an outwardly extended flange, and means to unite and clamp said plates.

5. In a device of the character described, the combination with a pipe union having an end piece provided with a screw-threaded enlargement at one of its ends and mounted on one of the pipes and a tail piece mounted on the adjacent end of the other pipe and provided with an annular flange at one of its ends, of a plate having a screw-threaded opening and mounted on said end piece, another plate having an opening tapered from the first named plate and surrounding said tail-piece, a sleeve consisting of a plurality of curved sections having its outer surface tapered to correspond with the taper of the opening in the last named plate, said sleeve located in said opening and having at one of its ends an outwardly extended flange, and means to unite and clamp said plates.

6. In a device of the character described, the combination with a pipe union having an end piece provided with an enlargement at one of its ends mounted on one of the pipes and a tail piece mounted on the adjacent end of the other pipe and provided with an annular flange at its end adjacent to said end piece, of a plate having an opening for the reception of said end piece, a sleeve mounted on the end piece between it and the wall of the opening in said plate and having a flange to engage the enlargement on said end piece and said plate, another plate having an opening tapered from the first named plate and surrounding said tail-piece, a sleeve having its outer surface tapered to correspond with the taper of the opening in the last named plate, said sleeve located in said opening and having at one of its ends an outwardly extended flange, another sleeve interposed between the tapered sleeve and the tail piece and having at one of its ends a flange to rest against the flange of said tapered sleeve, and means to unite and clamp said plates.

WILLIAM H. WAFER.

Witnesses:
CHAS. C. TILLMAN,
L. F. PUZICK.